UNITED STATES PATENT OFFICE.

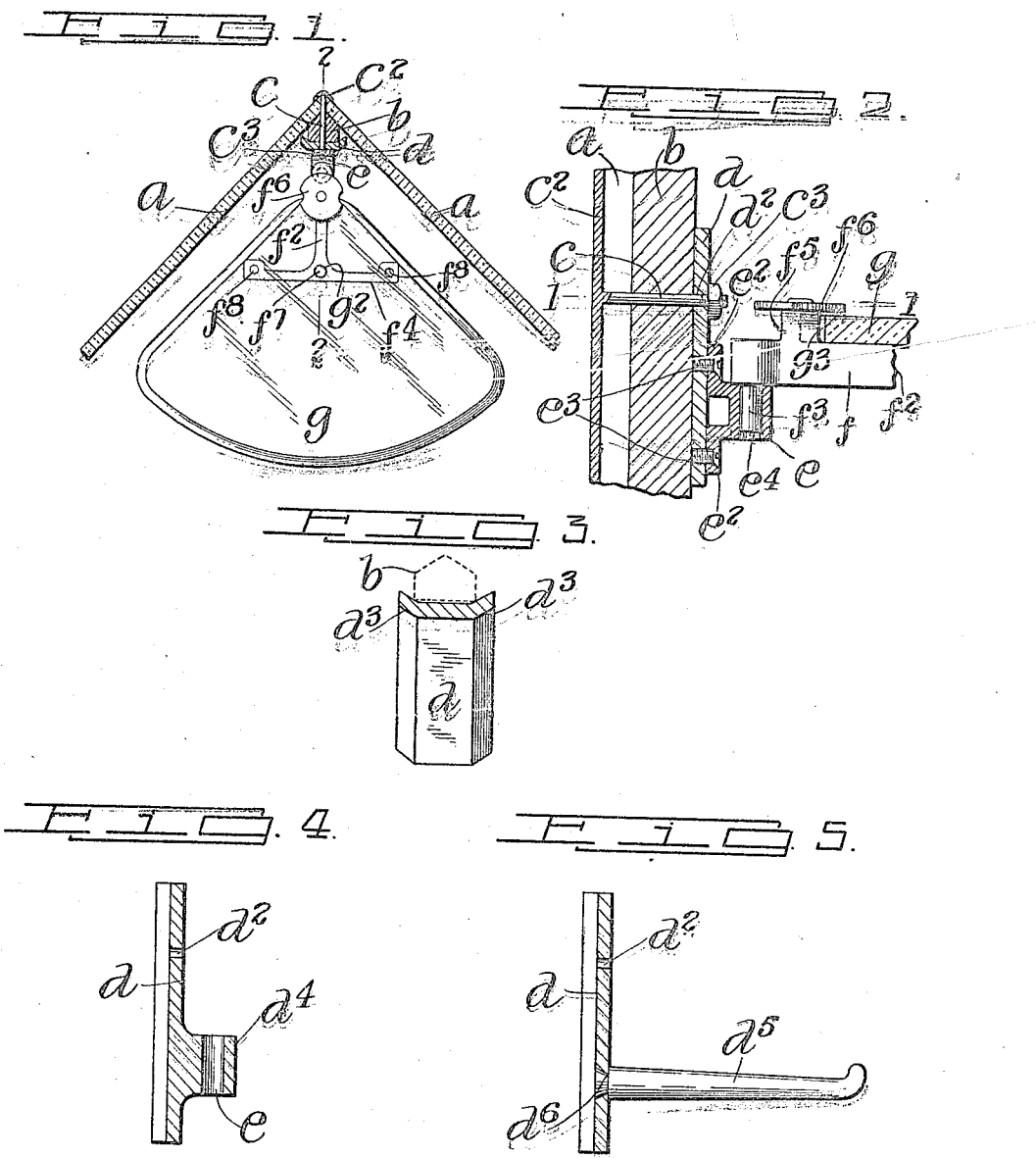

GUILDFORD G. HOUGHTON, OF NEW YORK, N. Y.

CORNER SHELF FOR DISPLAY-WINDOWS.

1,222,762.

Specification of Letters Patent.

Patented Apr. 17, 1917.

Application filed April 6, 1915. Serial No. 19,465.

*To all whom it may concern:*

Be it known that I, GUILDFORD G. HOUGHTON, a subject of the King of Great Britain, and residing at New York, in the county of New York and State of New York, have invented certain new and useful Improvements in Corner Shelves for Display-Windows, of which the following is a specification, such as will enable those skilled in the art to which it appertains to make and use the same.

This invention relates to corner shelves for display windows, display cases, frames and the like, and particularly to devices of this class composed of steel frames and transparent panels, and the object thereof is to provide improved means for attaching corner shelves or brackets to the frame of apparatus or devices of the class specified without in any way changing the construction of said frames, or the means for securing the transparent panels or side members thereto.

The invention is fully disclosed in the following specification, of which the accompanying drawing forms a part, in which the separate parts of my improvement are designated by suitable reference characters in each of the views, and in which:—

Figure 1 is a cross section through a display window or show case provided with my improvement;

Fig. 2 a section on the line 2—2 of Fig. 1;

Fig. 3 a detail view showing a bracket plate which I employ and indicating in dotted lines a part of the frame of the display window or show case;

Fig. 4 a view similar to Fig. 2 but showing only the bracket plate and showing a modification; and, Fig. 5 a view similar to Fig. 4 but showing another modification.

In the drawing forming part of this specification, reference being made to Figs. 1 and 2, I have shown at $a$ the adjacent side portion of a display window, or a display or show case, connected at an angle of ninety degrees by a vertical frame member or post $b$ placed in the angle formed by the parts $a$, and a pin, bolt, or screw $c$ passed inwardly between the parts $a$ and through the frame member $b$ and the outer end of which is provided with a V-shaped head $c^2$.

In the ordinary use of the frame member $b$ and the screw, bolt or pin $c$, the latter is provided at its inner end with a thumb nut or similar device whereby the parts $a$ and $b$ are bound together, but in my improvement I mount on the inner face of the frame member $b$ a bracket plate $d$ which is oblong in form and of any desired length, and which is provided with a pin, bolt or screw hole $d^2$ and is connected with the frame member $b$ by the pin, bolt or screw $c$ provided at its inner end with a nut $c^3$.

All the foregoing construction except the bracket plate $d$ is old and well known and forms no part of my invention.

In the form of construction shown, the frame member $b$ has a flat inner face, and the outer face thereof is so formed as to fit snugly in the angular corner formed by the parts $a$ and the bracket plate $d$ is provided with curved side portions $d^3$ which prevent its turning or lateral movement on the frame member $b$.

In the construction shown in Figs. 1 and 2, the bracket plate $d$ is provided with a supplemental bracket member $e$ having vertically arranged ear members $e^2$ whereby it is detachably secured to the bracket plate $d$ by screws or other devices $e^3$, and the supplemental bracket member $e$ is provided with a vertically arranged pin hole $e^4$, and connected with the supplemental bracket member $e$ in a horizontal position is a shelf holder $f$ which is triangular or T-shaped in form, and the main arm $f^2$ of which is provided at its rear end with a pin $f^3$ which enters the pin hole $e^4$, and said part $f^2$ is also provided adjacent to its rear end with a raised member $f^5$ having a circular top plate or head $f^6$.

The cross head portion $f^4$ of the shelf holder $f$ is provided with a vertical pin $f^7$, and at each end thereof with adjusting screws $f^8$ which are passed vertically therethrough, and mounted on the shelf holder $f$ is a triangular shelf $g$ preferably made of transparent material and provided with a hole $g^2$ through which the pin $f^7$ passes and which is larger than said pin, and the inner corner of the shelf $g$ is provided with a recess $g^3$ adapted to receive the part $f^5$. The shelf $g$ is preferably transparent but may be made of any desired material and the shelf holder $f$ may also be detached and the parts $d$, $e$ and $f$ are all detachably connected, and this facilitates the packing and shipping of the device or apparatus as a whole.

It must be borne in mind that my invention is not limited to the idea of forming both of the parts $a$ of the display window, or case, of transparent material and it must also be borne in mind that the shelf holder $f$ and the method of connecting the shelf $g$ therewith are old and well known and form no part of my invention, and the details thereof, or the method of connecting the shelf $g$ with the shelf holder $f$ are not fully shown herein but are only indicated.

In Fig. 4, I have shown a modification in which the bracket plate $d$ is provided with an integral shoulder or projection $d^4$ in which the pin hole $e^4$ is formed, and the shelf holder $f$ may be connected with this form of bracket plate, as clearly indicated in Fig. 2.

In Fig. 5, I have shown another form of the bracket plate $d$ in which said bracket plate is provided with a forwardly directed arm $d^5$ which is secured thereto as shown at $d^6$ and which may be used as a support for various articles to be displayed within the window or show case.

Having fully described my invention, what I claim as new and desire to secure by Letters Patent, is:—

A combined corner fastening and shelf support comprising a bolt having a V-shaped head for engaging the outer surface of the meeting edges of two vertically disposed glass sheets, a vertical post provided with an angular face for engagement with the inner surface of said glass, said bolt passing through said post, a vertical plate mounted on said bolt and having outwardly extending wings engaging the lateral edges of said post for preventing said plate from turning on the post, a nut engaging the inner end of said bolt for securing the glass sheets, post and plate together, and a lug provided on said plate for supporting a shelf.

In testimony that I claim the foregoing as my invention I have signed my name in presence of the subscribing witnesses this 2nd day of April, 1915.

GUILDFORD G. HOUGHTON.

Witnesses:
C. MULREANY,
H. E. THOMPSON.

Copies of this patent may be obtained for five cents each, by addressing the "Commissioner of Patents, Washington, D. C."